Aug. 27, 1935.  T. D. DAVIDSON  2,012,933
SIGNAL GLASS
Filed March 5, 1929

Inventor.
Thomas D Davidson
By George J Drury
Attorney.

Patented Aug. 27, 1935

2,012,933

UNITED STATES PATENT OFFICE 2,012,933

SIGNAL GLASS

Thomas D. Davidson, San Francisco, Calif.; Ellinor Campbell Davidson, executrix of said Thomas D. Davidson, deceased, assignor to Chrysler Corporation, Highland Park, Mich., a corporation of Delaware Application March 5, 1929, Serial No. 344,241

3 Claims. (Cl. 177—329)

This application is a continuation-in-part of my co-pending application Serial No. 421,761, filed November 4, 1920, for an improvement in Signal glass and in which other claims are made and to which reference is herein made.

My present invention has for its object the provision of a surface of reflection in a transparent medium such as glass whereby rays received thereon are reflected back parallel to the direction from which they are received, regardless of the angle presented by the receiving surface of the medium to the approaching beam; whereby I obtain a reflection of a light beam back to its original source. I obtain from my signal glass a reflection from a moving light source back upon itself, over any angle, within much wider limits, than has heretofore been attained. It is well known that a plain reflecting surface will reflect a beam of light according to the law of optics, that the angle of reflection is equal to the angle of incidence. In my signal glass I provide a plurality of reflecting surfaces so that the incident beam is reflected through a plurality of paths finally emerging from my signal glass as a reflected beam parallel with the incident beam.

These objects I attain by forming my signal glass with one side constituting substantially a plane surface or a surface of lens form, and on the opposite side, a plurality of regular tetrahedrons, a beam of light being received upon the relatively plane side of the glass then passes through and is reflected by the angular faces of the tetrahedrons within the glass and emerges again from the relatively plane side of the glass substantially parallel with the entering or incident ray.

By forming a portion only of the rear surface of the glass with the tetrahedrons, a portion of the glass will be relatively transparent and the portion formed with the tetrahedrons will be a reflector.

By the employment of my signal glass on the rear of one automobile the driver of another automobile approaching from the rear will obtain reflection of his own headlights from my signal glass and thus be warned regardless of any illumination ahead of him.

Where my signal glass is employed as above described, the lights of any approaching automobile will illuminate this glass to the driver of the said automobile, who will therefore at once be warned of the danger ahead, by the functioning of his own headlights which are reflected back to him by my signal glass. I have found that in the reflection from an individual tetrahedron formed on the back of my glass that the corners of the said tetrahedrons do not reflect to the degree that the body portion or center of the said tetrahedron, and therefore in forming my signal glass it will be found advantageous, depending upon the proportions of the tetrahedron employed, to cut off the said corners so that the base of the tetrahedron will be shaped as a hexagon. A number of tetrahedrons so formed will then entirely cover a given area. The particular form of tetrahedron best adapted is that known as a cube corner and also as a triple reflector and which consists of three right angled isosceles triangles with the right angles forming an apex and of a single equilateral triangle forming the base. In some cases I prefer to form the tetrahedron with a hexagonal base and in forming the glass, to merge the corners into each other so that while retaining the tetrahedron shape above as emerging from the plane of the glass, the said tetrahedrons will form themselves into groups of interbounding hexagons and have substantially all of the reflecting qualities of the full cornered tetrahedron.

By referring to the accompanying drawing my invention will be made clear:

Fig. 3 is a plan view of Fig. 2, with the lines of the corner cuts shown dotted in.

Throughout the figures similar numerals refer to identical parts.

Figure 1:
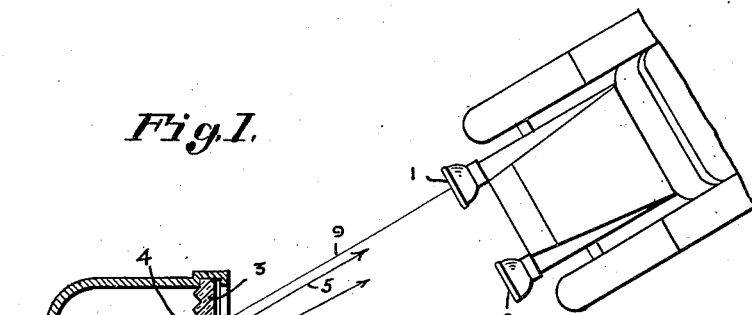
Fig. 1 shows my signal glass formed in combination with the tail light of an automobile and its illumination and reflection from my signal glass; in section.
Figure 2:
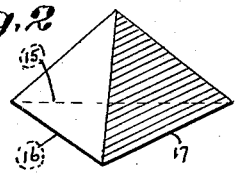
Fig. 2 is a perspective view of one of the tetrahedrons with the corners uncut.

The lights of an approaching automobile are indicated by the numerals 1 and 2 (see Fig. 1) the illumination of which is received upon the surface 3, 3, is transmitted through the glass, and reflected upon the rear surface thereof being the surfaces of a plurality of tetrahedrons as at 4, 4, and will emerge through the suraface 3 as a reflected beam as indicated at 5. This reflected beam will indicate at once to the driver of the approaching automobile through the reflection of the light from his headlights the obstacle to which my signal glass is attached. In the illustration Fig. 1 the signal glass is shown as forming a portion of the tail light 6 of an automobile, which tail light is ordinarily observable through the action of the electric light 7, and the lens portion 8, indicating the object as an obstruction. If the lamp 7 burns out or for any reason is extinguished there will still be a warning through the action of the reflecting portions of my signal glass and if the glass is of a red color the reflected beam 5 will be red even though the lights 1 and 2 are white.

Figure 3:
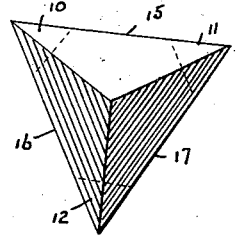
Figure 4:
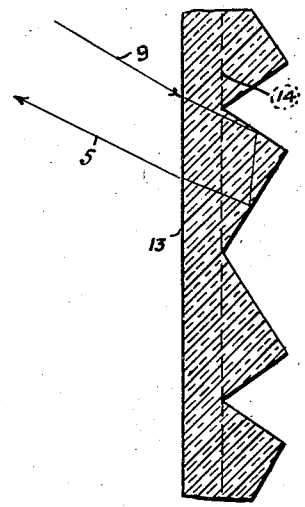
Fig. 4 is an enlarged cross section through a portion of the signal glass as on the line V—V of Fig. 5.
Figure 5:
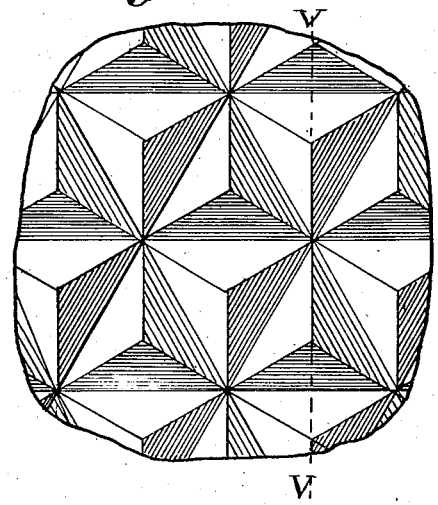
Fig. 5 is an enlarged view of a portion of several of the tetrahedrons as formed on one side of the glass of Fig. 1.

In Fig. 4 is shown the path of a ray of light 9 striking the cross-section of the glass and its reflection outward again as the ray 5. The tetrahedron of Fig. 3 may be formed with the corners 10 and 11 and 12 left off so that in reality the geometrical figure resulting from the mutilation of the tetrahedron would in effect be a septahedron, having a regular hexagonal base and a plurality of such septahedrons will assemble on their bases with a single plane surface completely covering the said plane surface and thus forming a reflection of high efficiency. The reflected beam will be substantially parallel to the incident beam as at 5, 9, Figs. 1 and 4, regardless of the angle of incidence between the beams 9 and the surface 3 within very wide limits, and in forming my signal glass it is to be understood that I do not cut individual tetrahedrons and fit them to a sheet of glass but that I mold the glass with a relatively smooth surface on one side, or of any desired curvature or configuration, as that of a lens, and on the opposite side the glass is molded into a number of concavities all which are the apexes of closely adjacent similar tetrahedrons.

In Fig. 4 the smooth side of the glass is shown at 13 whereas the plane of the bases of the tetrahedrons is indicated by the line 14. The thickness between the lines 13 and 14 is made necessary to give support at the base edges, 15, 16, 17. Where the corners of the tetrahedrons 10, 11, 12 are omitted the base is left of hexagon form and the stub ends left by omitting the said corners may be merged into similar stub ends of other tetrahedrons and thus welded together give support to the structure. The base edges 15, 16, 17 may in such case lie practically within the smooth side of the glass.

It will be observed that with my signal glass I depend on the reflection within the tetrahedron, the light ray being at such time within the glass and that therefore no silvering or other coating is necessary to attain the desired result.

I claim:

1. A cover glass for signal lamps comprising a portion adapted freely to transmit light, and a portion provided with cube-corner prisms adapted to reflect light received by it from without the lamp.

2. A signal lantern cover glass comprising a light-transmitting portion and an integral light reflecting portion, said reflecting portion having a plane external surface and an interior surface provided with prisms in the shape of cube corners.

3. The combination in a signal lantern of a source of light, a cover glass having a portion adapted freely to transmit light and an adjacent reflecting portion, said reflecting portion covered with facets joined together in groups of three at right angles to each other.

THOMAS D. DAVIDSON